United States Patent [19]

Tamura et al.

[11] 4,358,858
[45] Nov. 9, 1982

[54] OPTICAL INFORMATION EXCHANGE SYSTEM

[75] Inventors: Koichiro Tamura, Funabashi; Hiroaki Tajima, Musashino; Yoshikuni Okada; Shinji Umeyama, both of Ibaragi, all of Japan

[73] Assignees: Agency of Industrial Science & Technology; Ministry of International Trade & Industry, both of Tokyo, Japan

[21] Appl. No.: 244,740

[22] Filed: Mar. 17, 1981

[30] Foreign Application Priority Data

Jun. 21, 1980 [JP] Japan .................................. 55/84276

[51] Int. Cl.³ .............................................. H04B 9/00
[52] U.S. Cl. .................................. 455/607; 350/96.15; 350/96.18; 350/171; 350/174
[58] Field of Search ............... 455/607, 606, 610, 612, 455/600; 370/1, 3; 350/96.18, 96.15, 169, 171, 174, 96.16

[56] References Cited

U.S. PATENT DOCUMENTS

| 3,453,036 | 1/1969 | Swope | 350/171 |
|---|---|---|---|
| 3,883,223 | 5/1975 | Hudson | 350/96.18 |
| 3,932,184 | 1/1976 | Cohen | 350/96.18 |
| 4,001,704 | 1/1977 | Meyer | 350/96.18 |
| 4,166,946 | 9/1979 | Chown | 455/612 |
| 4,185,885 | 1/1980 | Chown | 350/96.18 |
| 4,196,962 | 4/1980 | Sick | 350/96.15 |

*Primary Examiner*—Howard Britton
*Attorney, Agent, or Firm*—Oblon, Fisher, Spivak, McClelland & Maier

[57] ABSTRACT

A plurality of optical transceivers are disposed on a given curved plane confronting the mirror surface of a cylindrical mirror with their optical axes pointing toward said mirror surface. Information transmission paths for optical signals are defined between the mirror surface and the curved surface. An optical signal emitted from one of said plurality of optical transceivers is reflected by the mirror surface, and incident upon the remaining transceivers serving now as receivers.

3 Claims, 11 Drawing Figures

Fig_1 (Prior art)
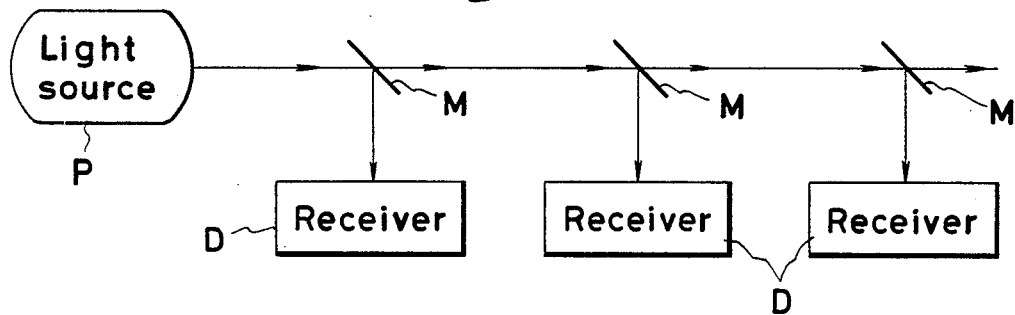
Fig_2 (Prior art)
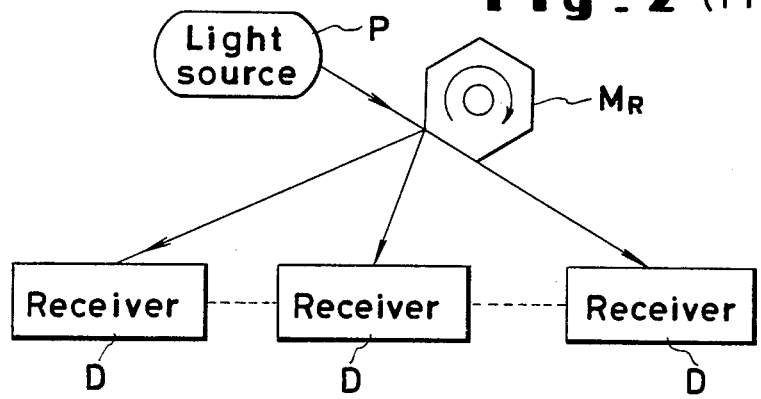
Fig_3 (Prior art)
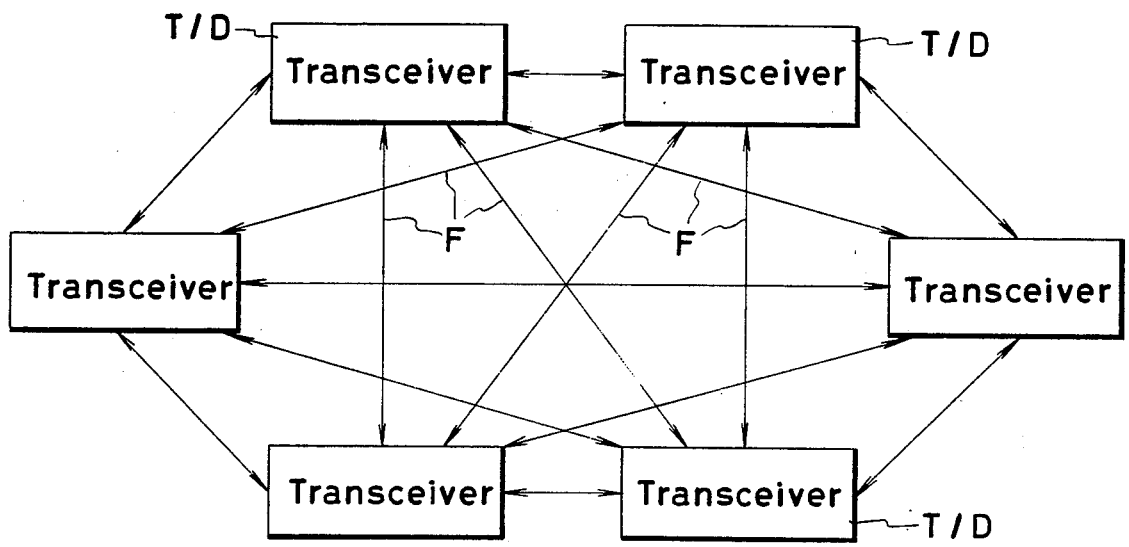

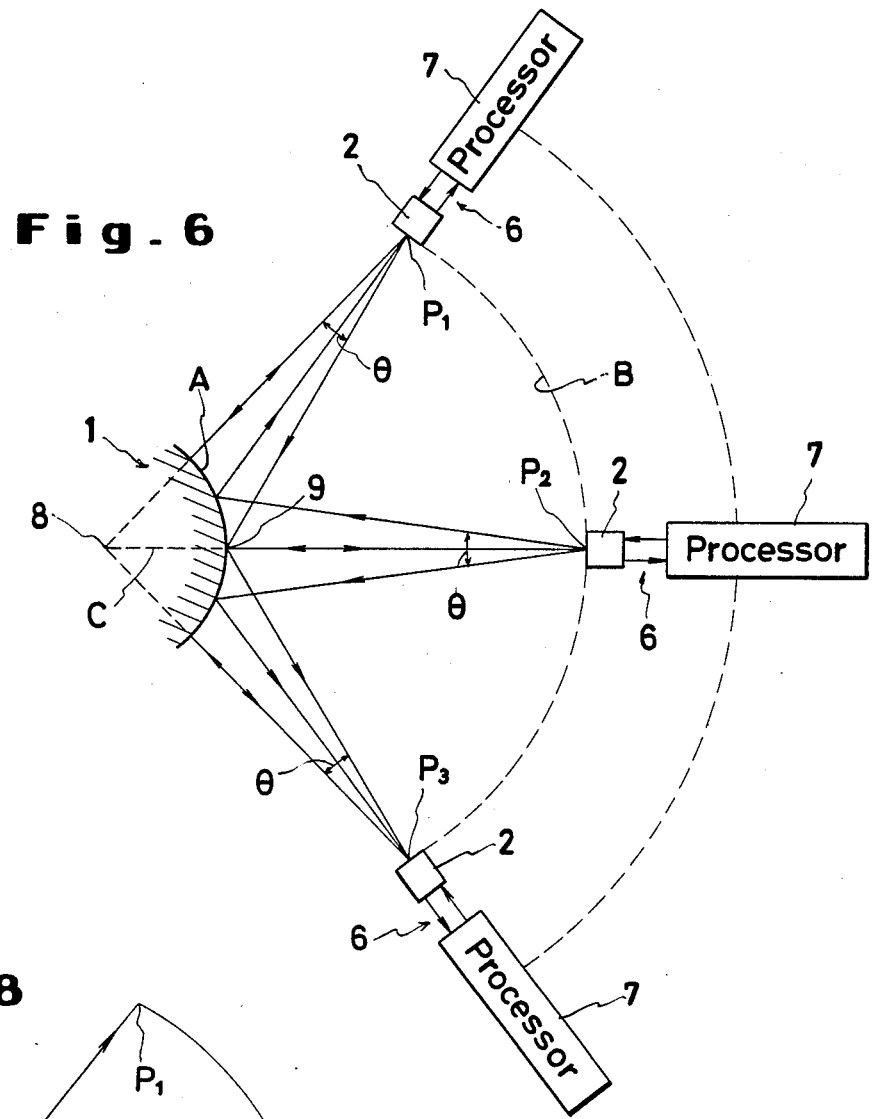
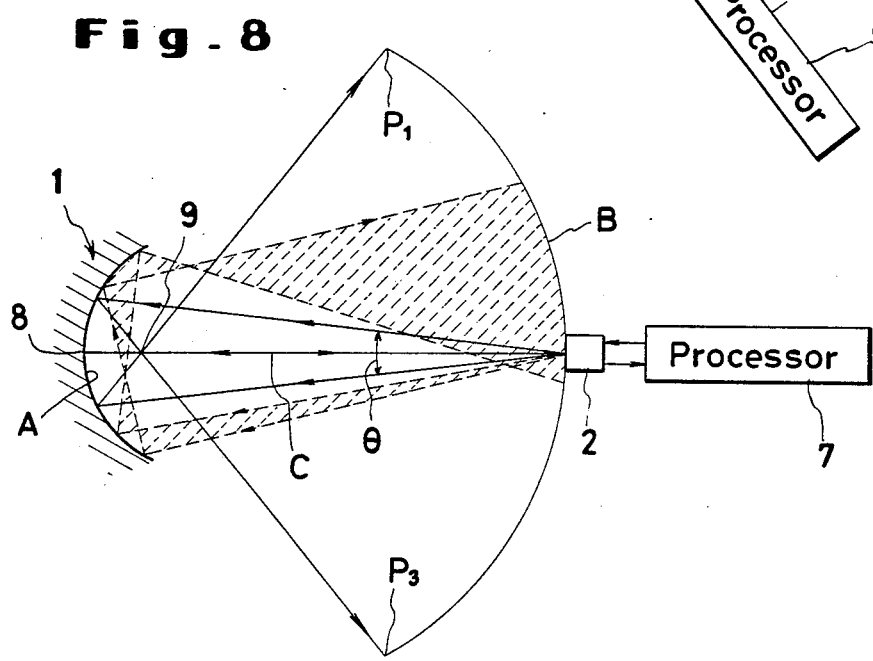

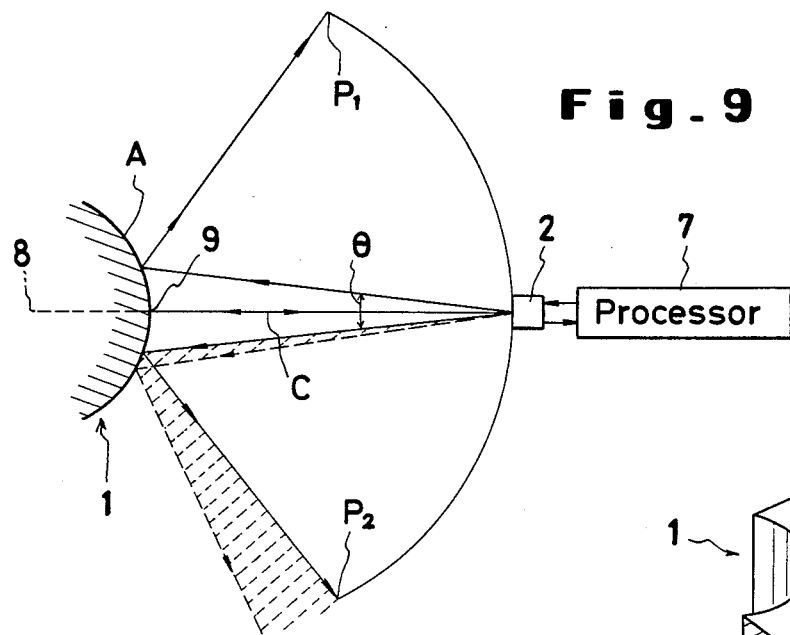
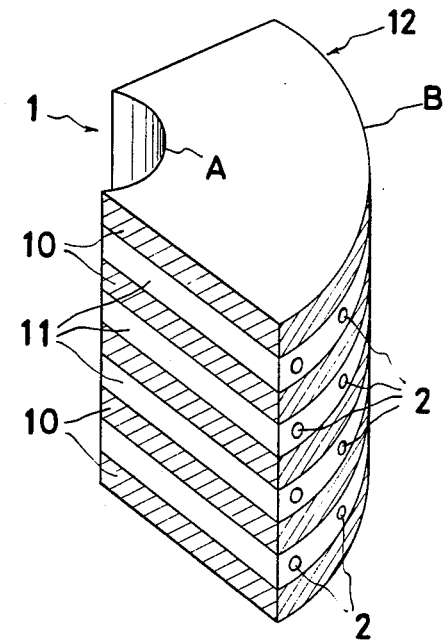
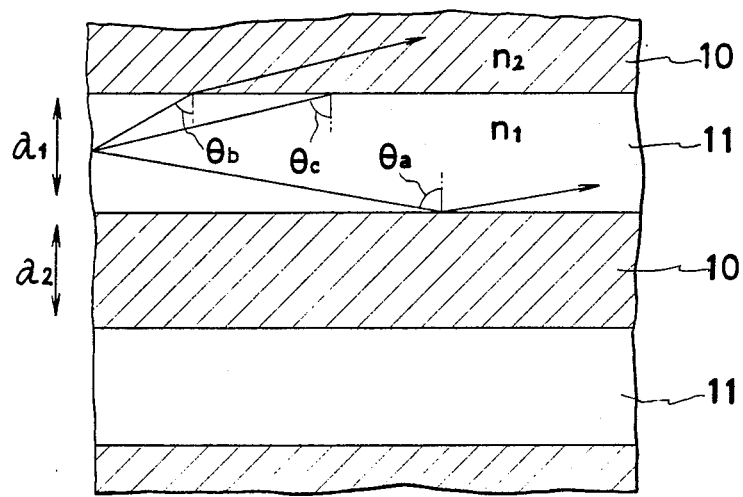

OPTICAL INFORMATION EXCHANGE SYSTEM

BACKGROUND OF THE INVENTION

The present invention relates to a system for the information exchange through an optical medium.

Heretofore, the transmission of information has ordinarily been carried out by conducting electrical signals by way of wires, and a coaxial cable or the like has been employed for the transmission of information with a high bit rate. Recently, optical techniques have been introduced for the transmission of optical signals using optical fibers as high-speed and reliable transmission lines.

However, the exchanging of optical information still presents a problem in connection with the establishment of information networks. In most cases, use is now made of a system that converts the optical signals into electrical signals which are in turn exchanged or distributed. As a matter of course, such a system cannot benefit from the high-speed and wide band characteristics of optical transmission, and is not applicable to equipment requiring frequent exchange of information, as in the case of multiprocessor systems equipped with hundreds of processors.

Besides, a variety of proposals have been made concerning systems for exchange of information carried by light without transferring it into electrical signals. In one of these, optical signals are divided by half-mirrors and distributed. In another, optical signals are sequentially distributed over the course of time using a rotating mirror etc. to change the direction of transmission. In still another, each individual optical transceiver is coupled to associated transceivers through optical fibers. None of these is, however, able to provide satisfactory results.

SUMMARY OF THE INVENTION

The main object of the present invention is to provide an information exchange system operable through an optical medium with high-speed and high reliability which can increase fan-out and is simple in construction.

According to the present invention, this object is achieved by an information exchange system operable through an optical medium comprising a cylindrical mirror and a plurality of optical transceivers which are disposed on a curved plane facing the mirror surface thereof and have their optical axes pointing toward the aforesaid mirror surface, said mirror surface and said curved plane defining therebetween information transmission paths for optical signals.

As will be evident from the foregoing, the present invention provides an information exchange system which is simple in construction, and yet permits high-speed and reliable transmission of information. This is because a plurality of optical transceivers can be disposed around the mirror surface of a cylindrical mirror without imposing limitations upon the number thereof, and be arranged in the same place.

Other objects and features of the present invention will be explained in detail with reference to the accompanying drawings:

BRIEF DESCRIPTION OF THE DRAWINGS

FIG. 1 is an explanatory view illustrative of a prior art system for dividing optical signals by half-mirrors;

FIG. 2 is an explanatory view illustrative of a prior art system for distributing optical signals, wherein the direction of light beams is controlled by a rotating mirror;

FIG. 3 is an explanatory view illustrative of a plurality of transceivers directly connected by optical fibers;

FIG. 6 is an explanatory view illustrative of another embodiment of the optical information exchange system according to the present invention;

FIG. 8 is an explanatory view showing the variation in light intensity which is brought about by use of a cylindrical concave mirror in the exchange system of the present invention;

FIG. 9 is an explanatory view showing the variation in light intensity, which is brought about by use of a cylindrical convex mirror in the exchange system of the present invention;

FIG. 10 is a view illustrative of parallel information transmission according to one embodiment of the optical information exchange system of the present invention; and FIG. 11 is a view illustrative of the transmission of light in the light-transmitting and -absorbing layers in the embodiment shown in FIG. 10.

DESCRIPTION OF THE PREFERRED EMBODIMENT

FIGS. 1 to 3 illustrate the prior art systems for the exchange of optical signals. Referring to FIG. 1, there is illustrated a half-mirror system, wherein the light emitted from a light source P is divided by half-mirrors arranged along the optical axis, and forwarded to associated receivers D. In this system, each time the light passes through one of the half-mirrors, the quantity of light is decreased by half and soon reaches the limit of fan-out. Consequently, the system does not permit the use of hundreds of receivers.

Referring to FIG. 2, there is illustrated a prior art system wherein the light from a light source has its direction changed over the course of time by a rotating mirror $M_r$ or by the electromagnetic optical effect of crystals (not shown), and is selectively directed to associated receivers D. This system has a disadvantage in that times on the millisecond order are required for direction control.

If, on the other hand, each individual optical transceiver T/D is connected in advance to all the remaining transceivers as shown in FIG. 3, satisfactory high-speed characteristics are obtained. However, since an enormous number of connections are required to provide all required transmission paths F, this system would still be complex and uneconomical.

Figure 4:
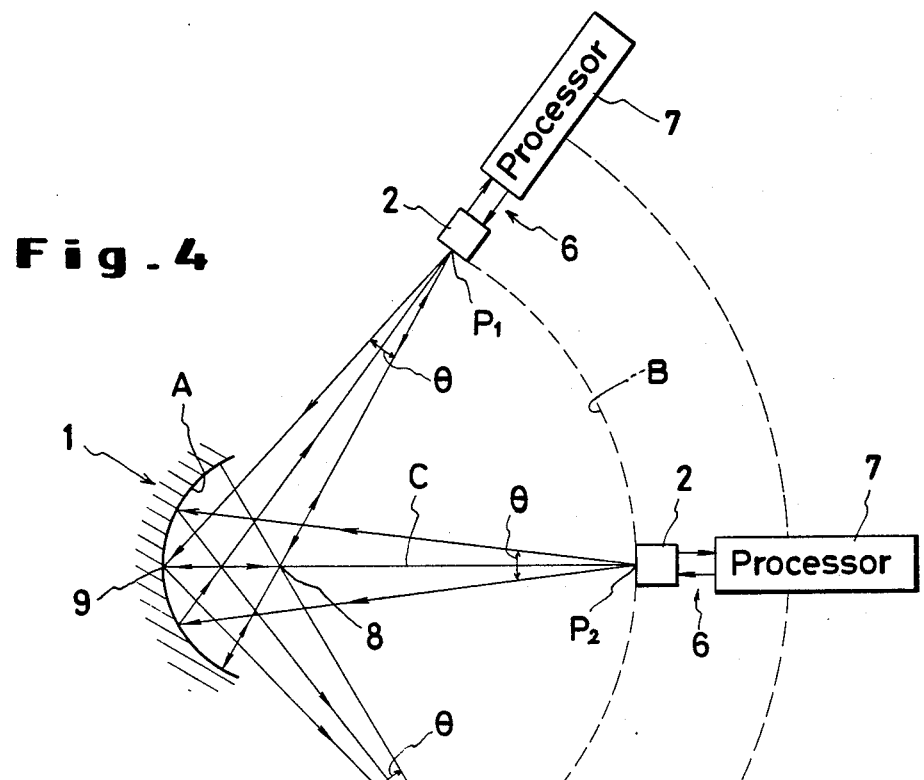
FIG. 4 is an explanatory view illustrative of one embodiment of the optical information exchange system according to the present invention, as applied to a broadcasting type bus.

FIG. 4 illustrates one embodiment of an optical information exchange system according to the present invention, which is shown as applied to a broadcasting type bus adapted for use in the exchange of information between the processors in a multiprocessor system.

Turning to the drawing, a plurality of optical transceivers 2 are disposed on a curved plane "B" (phantom line) facing the mirror surface "A" of a concave cylindrical mirror 1. For simplification of the explanation of the curved plane "B" to be given later, three transceivers 2 are placed at convenient positions, i.e., $P_1$, $P_2$ and $P_3$. However, it will be understood that a required number of the transceivers 2 may be located on the curved plane B.

Figure 5:
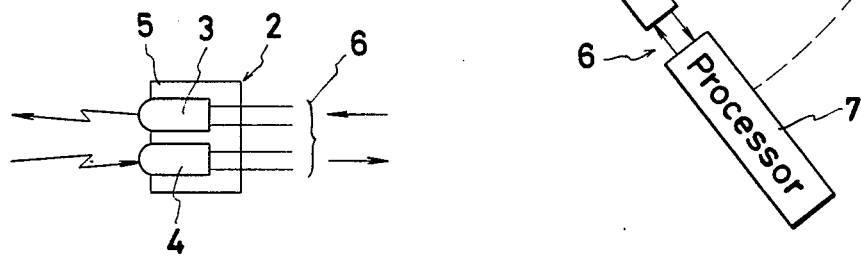
FIG. 5 is an explanatory view illustrative of a typical optical transceiver which can be used in the present invention.

The transciever used is known in the art and, by way of example, comprises a light-emitting element 3 such as a light-emitting diode or laser diode and a receiver element 4 such as a PIN photo diode or avalanche photo diode, which are integrated into a suitable housing 5, as will be seen from FIG. 5. Processors 7 are connected with the light-emitting and receiver elements 3 and 4 by a group of input and output lines 6 for electrical signals through suitable interface circuits (not shown). Accordingly, there are the same number of transceivers 2 as there are processors.

In this way, between the curved planes A and B in FIG. 4 is defined a common transmission path connecting each of the units 2 to the others. This will be explained further.

In FIG. 4, one optical transceiver 2 is placed at position $P_1$ where the light radiating from the curved plane B to the mirror surface A at an angle of radiation $\theta$ passes just between the center 9 of the mirror surface and the center 8 of a circular arc. When the transmitter element emits light, the light reflected from the cylindrical mirror surface A diffuses between position $P_1$ and position $P_3$ symmetrically with respect to $P_1$ around an axis C connecting point 9 to 8, and returns to the original point. This will clearly be understood from the properties of light. For instance, the light radiating from position $P_2$ on the axis C at an angle of radiation $\theta$ also diffuses between positions $P_1$ and $P_3$ on the curved plane B, and returns to $P_2$.

Thus, there is a continuous locus of points fulfilling the condition that the light radiating at an angle $\theta$ is reflected from the cylindrical mirror surface B, diffuses between positions $P_1$ and $P_3$, and returns to the original point. This continuous locus defines the curved line B, which is readily determined by optics and geometry. A required number of transceivers are then distributed on the thus determined curved line B. As an example, when emitting light to a cylindrical mirror with a radius of 100 mm, the curved line B defined between positions $P_1$ and $P_3$ has a length of about 490 mm and a radius of about 200 mm. In the transmission of data, a multiplicity of the receivers accept required data, and reject unnecessary data. This assures that the transmission of data is completed in one act of transmission irrespective of the number of receivers requiring that data. If there is an error in reception, re-transmission of the same data can be requested, thus increasing the reliability of transmission. In addition, the fan-out of the transmitters is by far greater than in a system employing wires. While a TTL bus driver, a commercially available semiconductor logic element, has a fan-out on the order of 10–30, the embodiment according to the present invention has an increased fan-out of, e.g., 1000 or more.

The cylindrical mirror 1 has two advantages that the light emitted from a transmitter at a relatively small angle of radiation, e.g., 20° to 30°, diffuses uniformly over a group of transceivers distributed in a wider range, and that a light-emitting element and a receiver element forming a transceiver can be placed in the same position, thus giving rise to reduction in the length of the wiring between the processors and the transceivers. Use of the cylindrical mirror is thus indispensable in the present invention.

Referring to FIG. 6, there is shown a second embodiment of the present invention, wherein the cylindrical mirror surface A of the cylindrical mirror member 1 has a convex surface. Like or equivalent parts are indicated by the same numerals as used in the first embodiment. Even though the concave mirror is replaced by the convex mirror, it will readily be understood that the principle of this embodiment is identical with that discussed with reference to FIG. 4, except that the direction of reflection of light is reversed. It will also be understood that the light emitted from any point between predetermined points $P_1$ and $P_3$ on a curved plane B confronting the cylindrical mirror surface A at an angle of radiation $\theta$ diffuses between the positions $P_1$ and $P_3$, and returns to that point. A required number of optical transceivers 2 are suitably distributed and disposed on that curved plane to define therebetween a transmission space for a broadcasting type bus. In both embodiments as referred to above, the condition that each individual optical transceiver is capable of sending light to all the remaining ones can be satisfied by separately varying the angle of radiation or field, $\theta$, of each individual optical transceiver, with no need of placing it on the same curved plane B.

Figure 7:
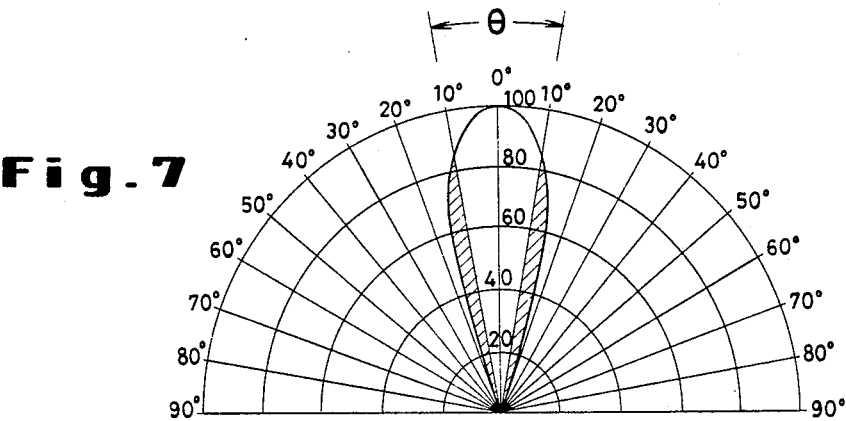
FIG. 7 is an explanatory diagram showing the directional characteristics of a light-emitting element.

In general, the convex mirror surface A as shown in FIG. 6 provides an additional advantages over the concave one. In the case of the concave mirror, unnecessary light is reflected from the mirror surface two or more times and returns to a given point on the curved plane defined by the group of transceivers, thus giving rise to a variation in light intensity. That is to say, the light-emitting element serving as a transmitter generally has directional characteristics as shown in the diagram of FIG. 7. On the other hand, the arrangement of FIG. 4 is designed so as to make use of an angle of radiation, $\theta$ (defined in FIG. 7), over which light has a relatively constant, large intensity. As a matter of course, however, light still remains in the hatched area outside of the $\theta$ area. Unless this hatched portion of light is cut out by stopping down the lens or otherwise using a slit, a part of the unnecessary light remaining in the hatched area beyond the region defined by $\theta$ (in FIG. 8) is reflected from the mirror surface two times, and returns to a given point on the curved plane B defined by the group of transceivers. This light may be superimposed on the required light which has been reflected once, with the danger that a variation in light intensity may occur. In some cases, this may cause a noise problem. While, in FIG. 8, unnecessary light is shown to be present only on the lower part for simplification of the explanation, it will be understood that such unnecessary light is also present on the upper part. The same considerations also hold for optical transceivers located at positions other than the single optical transceiver shown in FIG. 8.

As will be seen from FIG. 9, the convex mirror is characterized by the fact that all the unnecessary light in the hatched area outside of the $\theta$ region passes to the outside of the group of optical transceiver positions $P_1$–$P_3$, so that no variation in light intensity occurs among the group of transceivers. This makes possible highly reliable exchange of information, and eliminates the need for additional optical devices, thus providing additional advantages from the economical viewpoint. Like FIG. 8, FIG. 9 shows unnecessary light to be present only on the lower part.

FIGS. 4 and 6 show the two-dimensional arrangement for series transmission, which is converted into parallel transmission in the manner to be explained below: To easily achieve such object, two or more of the FIG. 4 or 6 arrangements may be laminated one upon another through partitions such as mirrors. This is, of course, satisfactory in principle, however, there is a difficulty in selecting the reflection factors of the partitions used. With an excessively large factor, a problem arises in that the phase distortion of waveforms takes place due to a difference in the optical paths. When the factor is low, on the other hand, another problem arises in connection with decreases in the quantity of light owing to absorption.

A good solution to the above-mentioned problems is to convert the transmission paths of FIG. 6 into a parallel construction, as shown in the embodiment of FIG. 10.

Referring to the parallel construction of FIG. 10, each individual layer comprises the optical transmission layer of FIG. 6 filled with a light-transmitting layer 11 of a suitable material. A required number of such layers are laminated one upon another with light absorbing layers 10 interposed therebetween, to thereby form a solid block or unit 12. The unit is then shaped on its one wall side into a cylindrical mirror surface A, and on its opposite side into a correspondingly curved plane. A required number of optical transceivers 12 are embedded in the layers 11 on the side of curved plane B.

Assume now that the reflector factors of the transmitting and absorbing layers 11 and 10 are given in terms of $n_1$ and $n_2$, respectively. As will be seen from FIG. 11 which is a partially enlarged view, a part of the light incident upon the boundary between the layer 11 and the partition layer 10 at an angle $\theta a$ greater than the critical angle $\theta c = \sin^{-1} n_2/n_1$ is subjected to total reflection on that boundary, and another part of the light incident at a smaller angle $\theta b$ is attenuated while passing into the absorbing layer 10. The reflector factors $n_1$, $n_2$ and the critical angle $\theta c$ can be set to desired values, thus rendering it possible to construct an arrangement which permits attenuation of a part of the light causing problems in connection with a large path difference and hence a phase difference, and effects total reflection of all the remaining light.

It goes without saying that the embodiment of FIGS. 10 and 11 is also applicable to the embodiment of FIG. 4 in which the cylindrical mirror surface A is a concave plane.

As mentioned above, the present invention provides an information exchange system operable through an optical medium, which comprises a cylindrical mirror and a required number of transceivers distributed and disposed on a given curved plane confronting the cylindrical mirror, the space between said mirror and said transceivers defining information transmission paths between all the transceivers, and has the advantages as mentioned below:

(i) The number of transceivers can be increased without imposing restrictions upon the number of transmission lines or paths between the transceivers.

(ii) An extremely high bit rate on the order of several GHz or more can be used by using light as a medium for information transmission.

(iii) High reliability is obtained since external electromagnetic noise has no adverse effect upon optical transmission.

(iv) Use of a cylindrical mirror makes it possible to place a transmitter and a receiver in the same place, resulting in reductions in the length of wiring and simplification of the overall construction. This gives satisfactory high-speed characteristics and high reliability to the system.

The above-mentioned advantages are inevitable in the realization of electronic computers, in particular, multiprocessor systems.

What is claimed is:

1. An optical information exchange system, comprising a cylindrical mirror and a plurality of optical transceivers disposed on a given curved plane confronting the mirror surface of said mirror with their optical axes pointing toward said mirror surface, an optical signal emitted from one of said plurality of optical transceivers being reflected by said mirror surface to fall incident upon the remaining transceivers serving as receivers.

2. An optical information exchange system as recited in claim 1, in which the cylindrical mirror is a convex mirror.

3. An optical information exchange system as recited in claim 1, in which the cylindrical mirror is a concave mirror.

* * * * *